US008015588B2

(12) United States Patent
Champel et al.

(10) Patent No.: US 8,015,588 B2
(45) Date of Patent: Sep. 6, 2011

(54) METHOD OF MANAGING AUXILIARY PROGRAMS AND A CORRESPONDING RECEIVER AND SYSTEM

(75) Inventors: Mary-Luc Champel, Marpire (FR); Ralf Schaefer, Acigne (FR)

(73) Assignee: Thomson Licensing S.A., Boulogne-Billancourt (FR)

(*) Notice: Subject to any disclaimer, the term of this patent is extended or adjusted under 35 U.S.C. 154(b) by 904 days.

(21) Appl. No.: 11/146,273

(22) Filed: Jun. 7, 2005

(65) Prior Publication Data

US 2005/0286861 A1 Dec. 29, 2005

(30) Foreign Application Priority Data

Jun. 11, 2004 (FR) .................................... 04 06364

(51) Int. Cl.
*H04N 7/173* (2011.01)
(52) U.S. Cl. .................... 725/116; 725/138; 725/146
(58) Field of Classification Search .................. 725/119, 725/120, 116, 131, 151, 114, 138, 144, 146
See application file for complete search history.

(56) References Cited

U.S. PATENT DOCUMENTS

| 5,790,935 | A | | 8/1998 | Payton | |
| 5,819,034 | A | * | 10/1998 | Joseph et al. | 709/201 |
| 5,966,120 | A | * | 10/1999 | Arazi et al. | 715/724 |
| 6,460,180 | B1 | * | 10/2002 | Park et al. | 725/40 |
| 2001/0016942 | A1 | * | 8/2001 | Harrison et al. | 725/36 |
| 2002/0089606 | A1 | * | 7/2002 | Forler et al. | 348/569 |
| 2003/0056224 | A1 | * | 3/2003 | Stone | 725/112 |
| 2003/0115612 | A1 | * | 6/2003 | Mao et al. | 725/136 |
| 2004/0025181 | A1 | * | 2/2004 | Addington et al. | 725/58 |
| 2004/0034863 | A1 | * | 2/2004 | Barrett et al. | 725/38 |

FOREIGN PATENT DOCUMENTS

| FR | 2 845 555 A1 | 4/2004 |
| WO | WO 97/19560 A1 | 5/1997 |
| WO | WO 02/01852 A1 | 6/2001 |

OTHER PUBLICATIONS

"Digital Television Application Manager", Proceedings on the 2001 IEEE International Conference on Multimedia and Expo, Aug. 22, 2001, pp. 685-688, XP010662062.

* cited by examiner

*Primary Examiner* — Farzana Hossain
(74) *Attorney, Agent, or Firm* — Osha • Liang LLP

(57) ABSTRACT

A method of managing auxiliary programs broadcast with main programs in a digital data stream, wherein the method is implemented by a receiver, involving receiving several digital data streams including the aforementioned digital data stream, detecting data identifying all the auxiliary programs contained in said digital data stream, extracting all the auxiliary programs identified in the stream, and storing all of the auxiliary programs identified and extracted from the digital data stream, wherein the extraction is followed by analyzing execution commands associated with the extracted auxiliary programs.

7 Claims, 5 Drawing Sheets

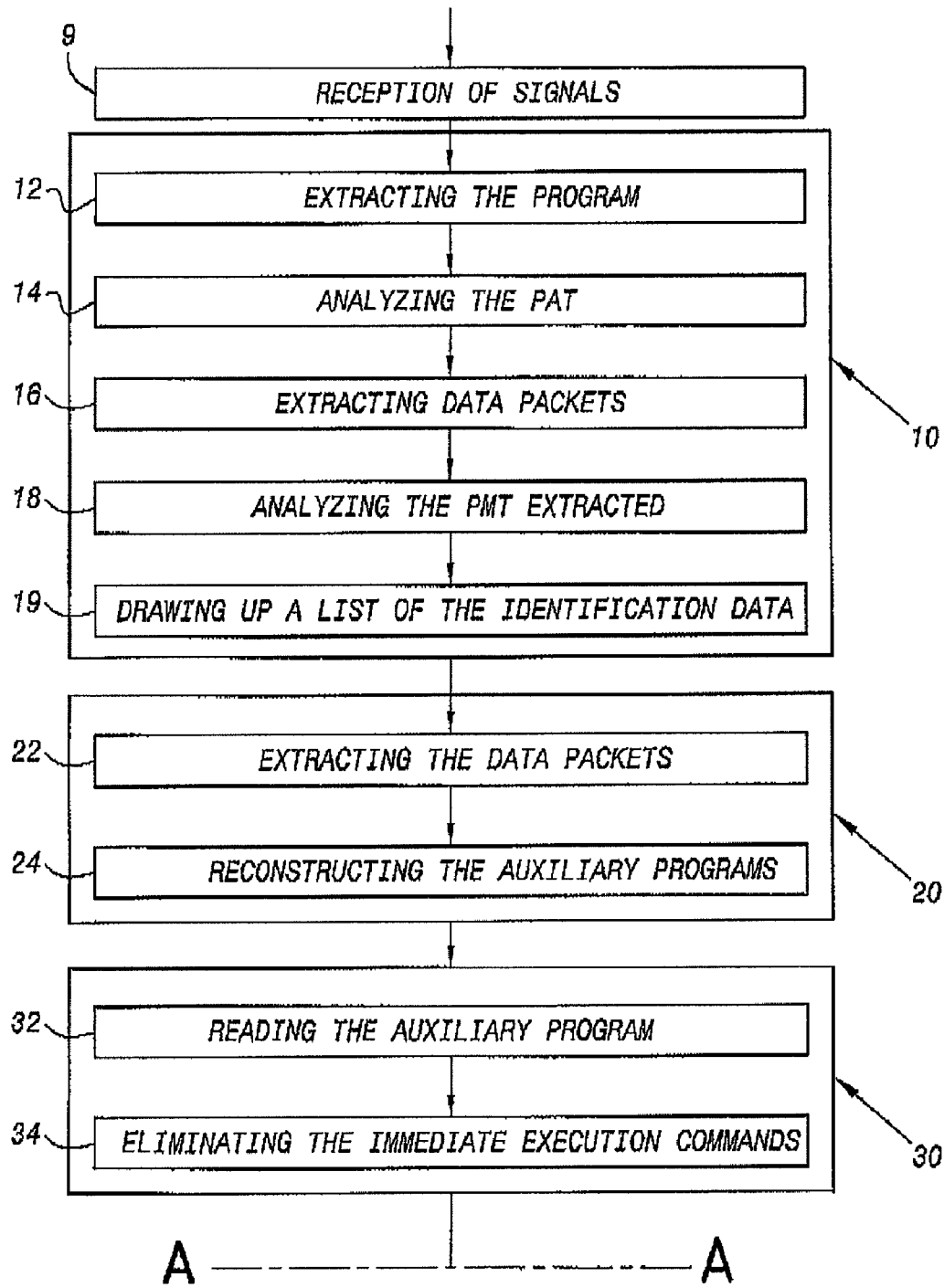
FIG.3 (beginning)

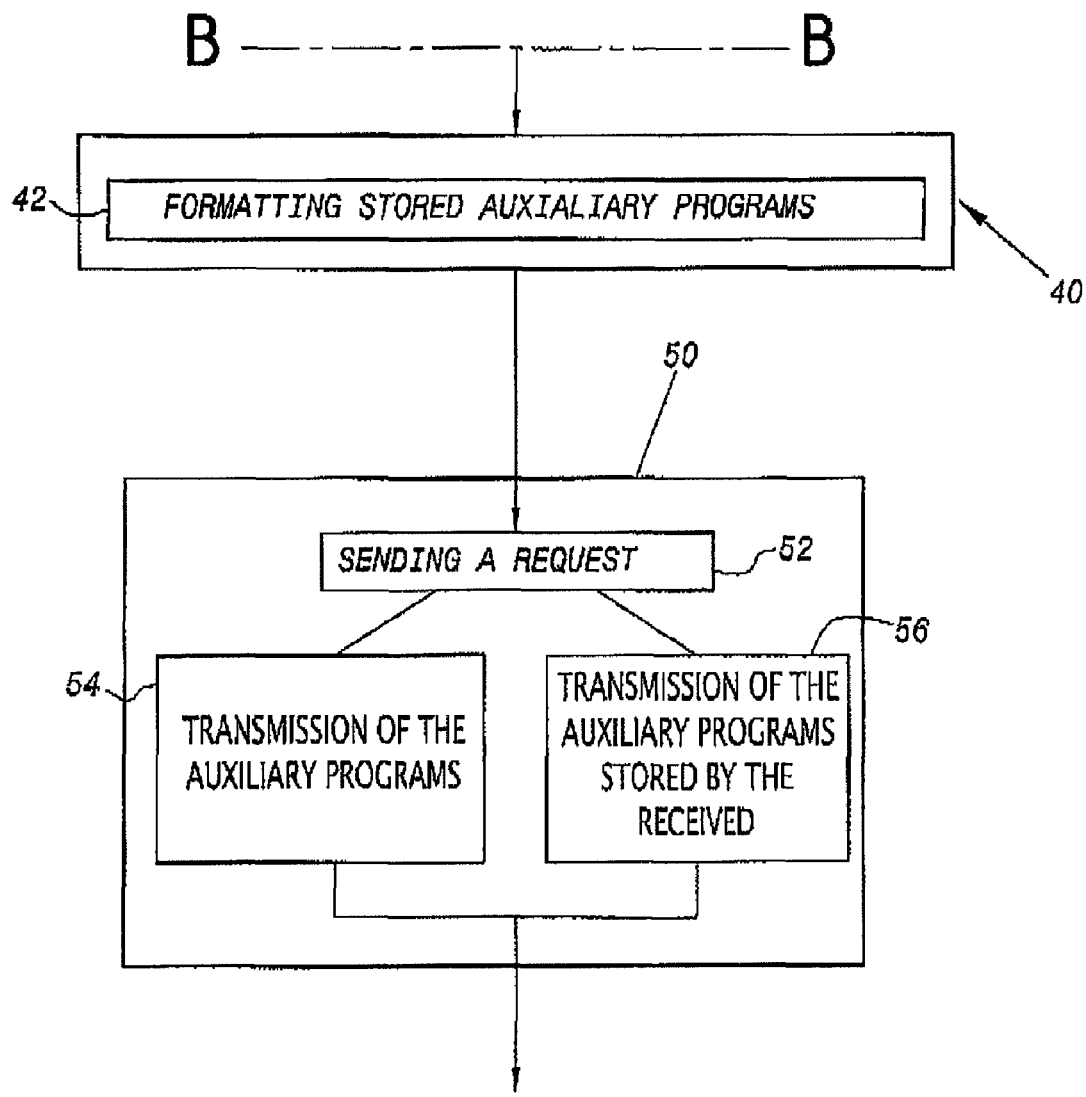
FIG.3 (end)

METHOD OF MANAGING AUXILIARY PROGRAMS AND A CORRESPONDING RECEIVER AND SYSTEM

The present invention relates to a method of managing auxiliary programs broadcast with main programs in a stream of digital data, to a receiver for implementing this method, and to a system including this receiver.

BACKGROUND OF THE INVENTION

In the field of broadcasting, in particular of radio broadcasting, programs, commonly referred to as "transmissions", are sent from a transmitter to a plurality of receiver terminals.

Thus radio programs, television programs, and interactive programs allow access to auxiliary programs such as video, audio, or interactive programs in the context of broadcasting main programs.

Methods of managing auxiliary programs are known in the art that aim to enable an auxiliary program to be used subsequently to its broadcast window, in particular from the published international application WO-01/50763-A1.

The above document describes in detail a method of managing an analog stream, but makes no reference to how to manage a plurality of auxiliary programs broadcast with main programs in a digital data stream.

In the context of digital applications, auxiliary programs and main programs are multiplexed and transmitted in the same digital data stream.

All the main and auxiliary programs are transmitted in sections in a cyclic sequence that is repeated continuously, the various portions of the programs being time-division multiplexed. Transmission of this kind is commonly referred as "carrousel transmission" or "carousel transmission."

In response to a request to access a given program, the receiver locks onto one of the digital data streams from a plurality of streams that form the transmission.

During a first cycle of listening to the carrousel transmission, the receiver detects data identifying programs and in particular a required auxiliary program.

Using this identification data, during a second cycle of listening to the digital data stream, the receiver extracts all the constituent elements of the required auxiliary program in order to reconstruct it and to execute it either immediately or subsequently.

The details of such transmission are known in the art and are set out in particular in the specification ISO 13818.6, which is part 6 of the standard defining MPEG-2 coding.

However, the above management method gives rise to the problem that the receiver must wait for a plurality of transmission cycles, i.e. turns of the carrousel, in order to be able to reconstitute the whole of the auxiliary program required by the user, which waiting time makes the system less user-friendly and in particular less interactive.

Accordingly, there is at present no method of managing auxiliary programs broadcast with main programs in a digital data stream that enables rapid execution of an auxiliary program required by a user.

OBJECT AND SUMMARY OF THE INVENTION

The object of the present invention is to solve this problem by providing: a method of managing auxiliary programs enabling them to be executed rapidly in response to a request; a receiver implementing this method; and a corresponding system.

To this end, the invention consists in a method of managing auxiliary programs broadcast with main programs in a digital data stream, the method comprising:
 a step of receiving a plurality of digital data streams including said digital data stream;
 a step of detecting data identifying all the auxiliary programs contained in said digital data stream;
 a step of extracting all the auxiliary programs identified in the stream; and
 a step of the receiver storing all of the auxiliary programs identified and extracted from the stream.

Systematically detecting and storing all auxiliary programs in the receiver subsequently enable a user to make rapid use of the auxiliary programs.

The invention also consists in a receiver comprising means for receiving a digital data stream including main programs and auxiliary programs, the receiver further comprising selectively operable means for filtering data received in said digital data stream connected to storage means and to control means of the receiving means and the filtering means adapted to command systematic detection and systematic storage of all auxiliary programs in said digital data stream.

The invention further consists in a system for managing auxiliary programs broadcast with main programs in a digital data stream, the system comprising a transmitter of a digital data stream and a receiver of that digital data stream connected to forward all or a portion of said digital data to a user terminal, and wherein said receiver is a receiver as defined above.

BRIEF DESCRIPTION OF THE DRAWINGS

The invention will be better understood after reading the following description, which is given by way of example only and with reference to the appended drawings, in which:

FIG. 3 is a flowchart of the method of the invention; and

MORE DETAILED DESCRIPTION

Figure 1:
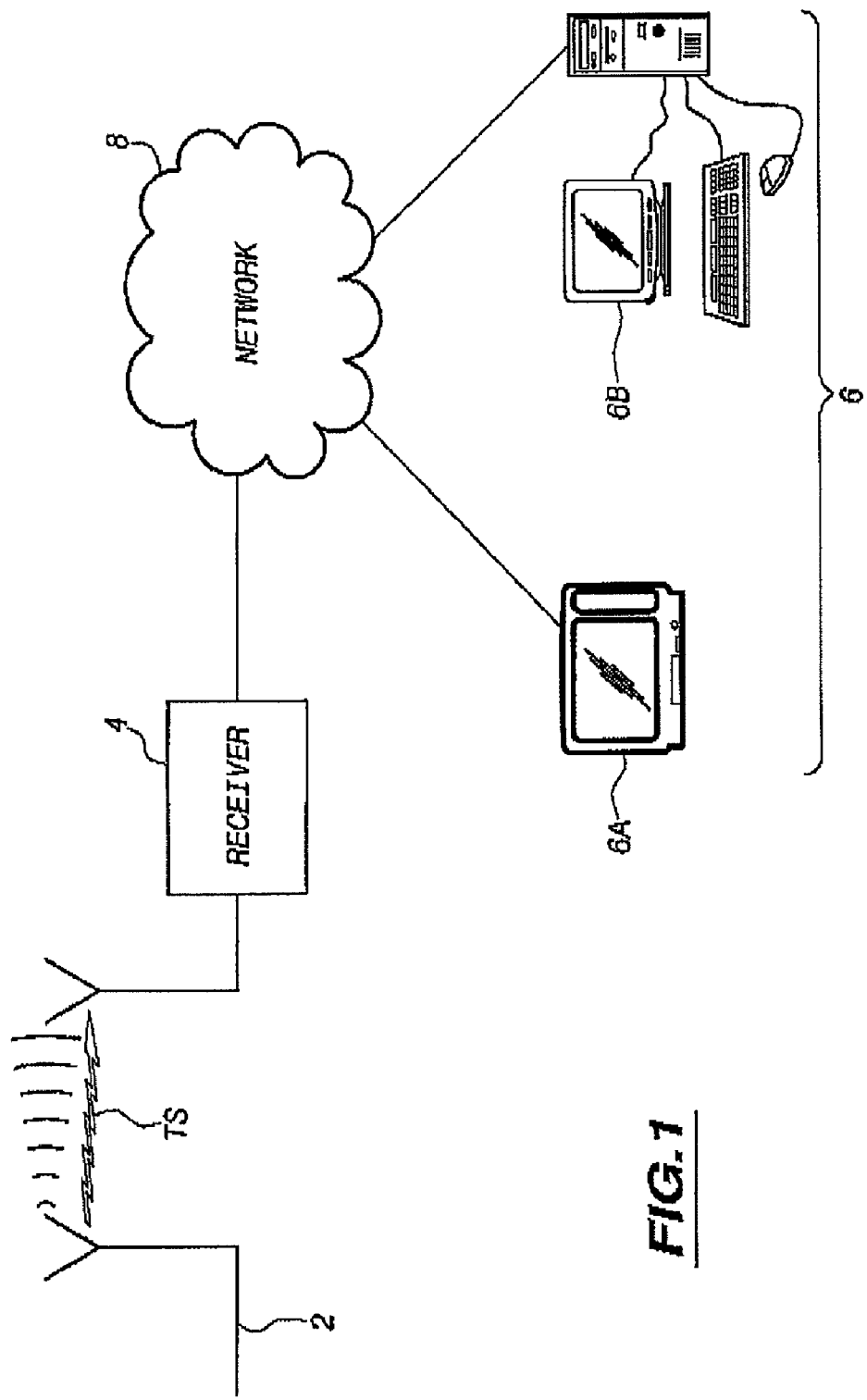
FIG. 1 is a block diagram of a system in which the invention is implemented.

The system represented in FIG. 1 is an interactive digital television system and includes a signal transmitter 2 for transmitting a digital data stream TS to a plurality of receivers and in particular to a receiver 4.

In the embodiment described, the receiver 4 is connected to user terminals 6 by means of a network 8 referred to as a "private" or "domestic" network. The arrangement and use of such networks are well known in the art and are not described in more detail here.

The user terminals 6 are referred to as "interactive terminals", they are capable of managing audiovisual data, and each of them includes a user interface.

In particular, the terminals 6 are adapted to receive interactive television programs and include a television 6A or a computer 6B, for example.

Figure 2:
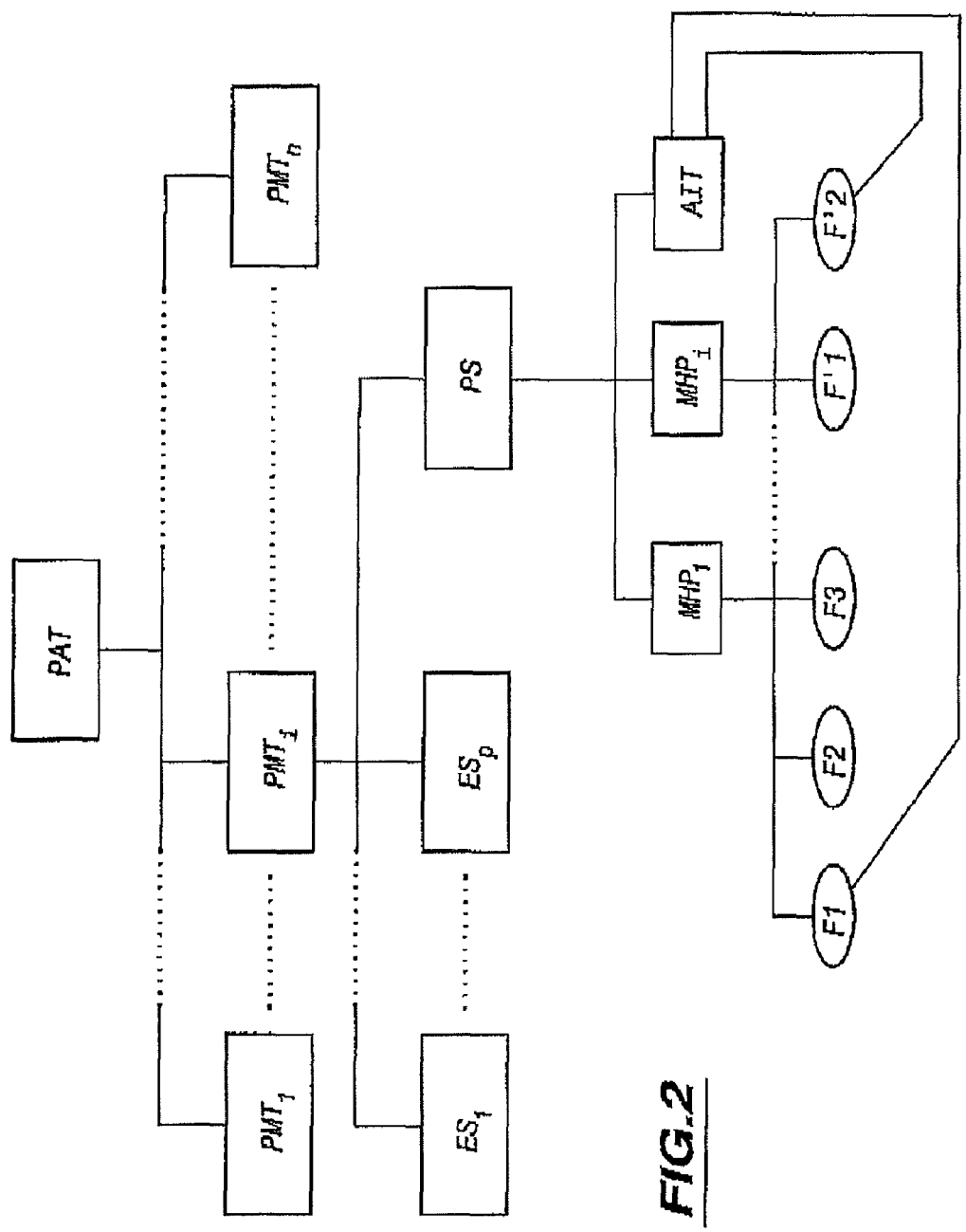
FIG. 2 is a diagram of a data structure used in the FIG. 1 system.

FIG. 2 is a diagram of the data structure of a particular digital data stream TS conveying main and auxiliary programs between the transmitter 2 and the receiver 4 using the carrousel mode of transmission.

Transmission using this kind of structure is commonly referred to as "Digital Storage Media Control and Command" (DSM-CC) transmission.

In this mode of transmission, all files are multiplexed and where applicable divided into a plurality of packets to constitute the stream TS that is transmitted cyclically.

Within this stream, each data packet is identified by its address or identification data. Certain of these addresses are fixed and others are assigned dynamically.

This data structure includes firstly a program association table (PAT) whose address is fixed and known. The PAT is a table of the correspondences between all the programs available in the data stream and their respective identification data.

The data structure for each program identified in this way then includes a program map table ($PMT_i$).

Each PMT is a table of the correspondences between all of the elementary streams (ES) that constitute the program and their respective identification data.

Each elementary stream ES includes a single type of data such as video data or audio data.

If a program includes auxiliary programs, which are commonly referred to as "Multimedia Home Platform (MHP) applications", they are located in specific elementary streams containing packets known as "private sections" (PS). These private section elementary streams include particular elements in their identification data enabling them to be recognized as elementary streams containing MHP auxiliary programs without it being necessary to decode them.

Thus the stream of private sections includes a plurality of MHP applications denoted $MHP_j$ each of which consists of a plurality of files $F_j$, for example. To enable all these files to be identified, the stream of private sections PS also includes an application information table (AIT) defining the correspondence between each MHP application and the addresses or identification data of the files that constitute it.

Furthermore, the same file Fi may be included in more than one MHP application.

The method of the invention used in the FIG. 1 system and using the FIG. 2 data structure is described next with reference to FIG. 3.

The method of the invention begins with a step 9 of receiving a plurality of digital data streams including the data stream TS, which includes a set of main programs and auxiliary programs conforming to the data structure described with reference to FIG. 2. The stream TS is transmitted continuously and cyclically and contains all the programs in time-division multiplexed form.

This reception step 9 corresponds to tuning a tuner unit to pick up a plurality of signals including the signal conveying the digital data stream TS and is executed either in response to a request from a user or automatically, for example when the system is started up.

The method then includes a step 10 of detecting identification data of all the auxiliary programs of the data stream TS.

This step 10 begins with a substep 12 of extracting the program association table PAT after recognizing the data packets constituting it that feature specific and particular identification data.

The method then includes a substep 14 of analyzing the PAT in order to recognize all the identification data of all the programs available in the stream TS.

This substep 14 is followed by a substep 16 of extracting all the data packets containing PMT type identification data in order to reconstruct the PMT of all the programs available in the data stream.

The step 10 then includes a substep 18 of analyzing all the PMT extracted during the substep 16 to obtain the identification data of all the MHP applications contained in the data stream in order to draw up, in a substep 19, an exhaustive list of all the identification data of all the MHP type auxiliary programs available in the digital data stream TS.

The method then includes a step 20 of extracting all the auxiliary programs identified in the digital data stream TS.

This step 20 includes a substep 22 of extracting all the data packets in the digital data stream TS that contain identification data corresponding to that forming the list determined during the substep 19.

The method then includes a substep 24 of reconstructing each of the auxiliary programs by recombining extracted data packets having the same identification data.

Accordingly, after the detection step 10 and the extraction step 20, all the available auxiliary programs in the data stream TS have been extracted.

The method advantageously then includes a step 30 of analyzing commands to execute the auxiliary programs.

This is because, in interactive digital television, there are different modes for commanding execution of auxiliary programs.

Certain execution commands include triggering conditions, such as time or date conditions, others are triggered at the request of the user, and further execution commands are synchronized to the transmitted digital data stream TS with a view to automatic execution thereof simultaneously with the transmission of a main program.

Such execution commands are generally referred to as immediate execution commands or "do it now" commands.

In the present example, all the auxiliary programs extracted from the transmitted digital data stream are cached with their execution commands. It is therefore necessary to eliminate any synchronization with a main program by eliminating the corresponding "do it now" commands.

To this end, the analysis step 30 includes a substep 32 of reading all the auxiliary program execution command data for all the extracted auxiliary programs.

This substep 32 is followed by a substep 34 of eliminating the detected immediate execution commands.

This eliminates the immediate execution commands, and the associated auxiliary programs can then be executed only by way of an explicit request.

The substep 32 is made possible by the use of identification data specific to the intermediate execution commands defined in the standard covering the DSM-CC MPEG-2 protocol.

The method then includes a step 40 in which the receiver 4 stores all the identified auxiliary programs extracted from the digital data stream TS.

This storage step 40 advantageously includes a substep 42 of formatting stored auxiliary programs for storage in a format suited to direct forwarding thereof to a terminal 6 and/or to immediate use thereof by a terminal 6.

In the embodiment described, the receiver 4 and the terminal(s) 6 are connected via a network 8 operating under the same protocol as the link between the transmitter 2 and the receiver 4, i.e. the DSM-CC MPEG-2 protocol.

Consequently, the substep 32 of formatting data to be stored corresponds to storing each of the data packets constituting the auxiliary programs in the received format.

Thus no supplementary step of decoding or recombining data is necessary, and the data packets forming the auxiliary programs are stored in the received format in order to be forwarded in the same format.

Consequently, the method includes no step of decoding data encoded to the MPEG-2 standard, thereby saving considerable computation time in the receiver 4.

Thus the management method of the invention systematically detects and stores all the auxiliary programs transmitted in the digital data stream TS.

The identification step 10, extraction step 20, analysis step 30 and storage step 40 are executed continuously on the digital data stream TS.

Moreover, to make the method of the invention more efficient, the receiver 4 stores for each auxiliary program, over and above the various files that constitute it, version data such as a service number and description data, for example.

Thanks to this data, the extraction step 20, analysis step 30 and storage step 40 are executed only in respect of new auxiliary programs or new versions of existing auxiliary programs, which in this case are substituted in the memory for the preceding versions.

This selection of stored auxiliary programs uses in particular version data conventionally available in the AIT.

The method includes a subsequent step 50 of access by a terminal 6 to the auxiliary programs.

This step 50 begins, for example, with a substep 52 in which the terminal 6 sends a request at the initiative of a user of the terminal.

Reception of that request by the receiver 4 leads to conventional transmission of the auxiliary program received by the receiver 4 to the terminal 6 during a substep 54 which is executed conventionally, the receiver 4 forwarding the data relating to the required auxiliary program to the terminal 6 as and when it arrives from the transmitter 2, i.e. at the speed of the transmission carrousel.

However, this transmission between the receiver 4 and the terminal 6 does not occupy the whole of the available bandwidth.

Consequently, the method includes a substep 56 of rapid transmission, in parallel with the substep 54, of the auxiliary program stored by the receiver 4 if, after the steps 10, 20, 30 and 40, the receiver 4 has the required auxiliary program in its memory.

This substep 56 is effected by transmission between the receiver 4 and the terminal 6 at a high bit rate in an available slot of the transmission carrousel.

Consequently, the terminal 6 receives the required auxiliary program in the normal way in the substep 54 and also receives it faster, in the substep 56, if the auxiliary program has already been stored by the receiver 4.

This kind of transmission is fast and is commonly referred to as "burst" transmission.

Parallel transmission of the auxiliary program by the receiver at normal speed and at a higher speed enables the user terminal 6 to retrieve data in the data stream transmitted at the normal speed that would have been lost in the data stream transmitted at the higher speed.

Consequently, thanks to the management method of the invention, the auxiliary programs are available to the terminal 6 either extremely quickly if they have already been stored or in the normal way otherwise.

Alternatively, the normal transmission effected during the substep 54 is inhibited if the required auxiliary program is already stored, in favor of fast transmission in the substep 56.

In all cases, the method of the invention is totally transparent to the terminal user, who is not involved in the identification, extraction and storage steps described.

The method of the invention is particularly advantageous in the case of a domestic network in which a plurality of different terminals may access simultaneously or successively different auxiliary programs conveyed by the same data stream.

This is because, when a terminal requires access to a particular data stream, all the auxiliary programs of that data stream are stored, so they are directly accessible to another terminal after the first access to this particular data stream.

Moreover, taking account of auxiliary program version data and synchronization data, and in particular of immediate execution commands, improves performance.

Figure 4:
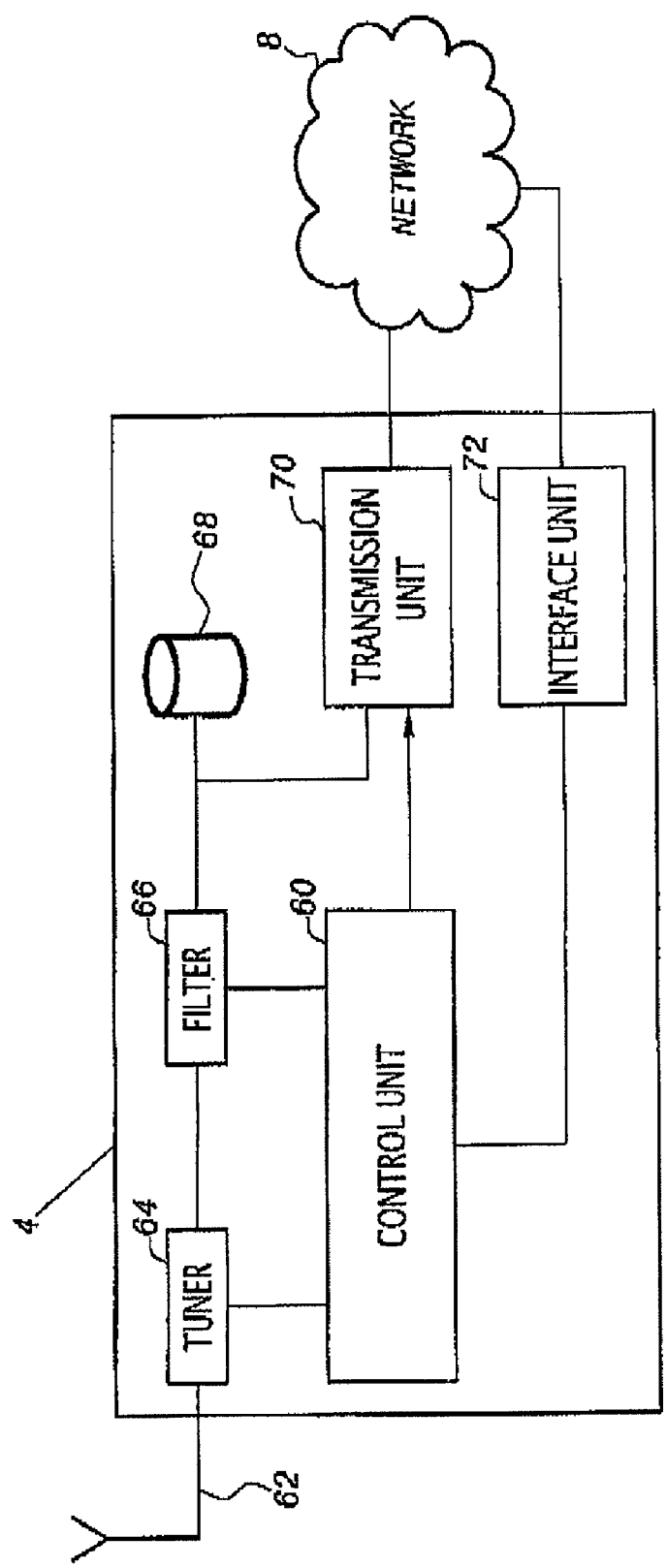
FIG. 4 is a block diagram of a receiver of the invention.

The receiver of the invention is described next with reference to FIG. 4, which is a generic block diagram thereof.

The receiver 4 includes a control unit 60 such as a microcontroller comprising in the conventional way a microprocessor associated with working memories, for example.

The receiver 4 also includes an antenna 62 adapted to the mode of transmission between the transmitter 2 and the receiver 3, such as a satellite antenna or a connection to a cable network, for example.

The antenna 62 is connected to a tuner unit 64 for locking the receiver 4 to one of the digital data streams received via the antenna 62.

The tuner unit 64 is controlled by the control unit 60, which sends it instructions relating to the identification of the digital data stream to be selected.

The tuner unit 64 is followed by a filter unit 66 for filtering the data packets received as a function of their identification data. This filter unit 66 is also controlled by the control unit 60.

The filter unit 66 is connected to a storage unit 68 consisting of any type of memory and advantageously of a permanent memory such as a "flash" memory.

The filter unit 66 and the storage unit 68 are both connected to a transmission unit 70 connected to the network 8 and controlled by the control unit 60.

Finally, the receiver 4 includes an interface unit 72 providing the interface to a user terminal 6, not shown in this figure, for receiving therefrom requests relating to auxiliary programs and/or to main programs, either directly or via the network 8.

Accordingly, in operation, a user uses the terminal 6 to request to receive a given program from a particular digital data stream.

The request is received by the interface 72, which forwards it to the control unit 60.

The control unit 60 then sends instructions to the tuner unit 64 in order to receive the particular data stream corresponding to execution of the step 9.

In parallel with conventional transmission of the required program, the receiver 4 executes the method of the invention.

The control unit 60 sends successive filtering instructions to the filter unit 66 in order to carry out the step 10 of detecting identification data of all the auxiliary programs in the received digital data stream followed by the step 20 of extracting all the auxiliary programs.

Once extracted from the received digital data stream, all the auxiliary programs are stored in the memory 58 (step 40).

All the auxiliary programs from the stream are then stored in the receiver 4 so that they are available very quickly to all the terminals connected to the network 8, in particular by means of burst transmission in the substep 56.

Other embodiments and variants of the invention may of course be envisaged.

In one variant, the nature of the connection between the receiver 4 and the terminal 6 is different from that between the transmitter 2 and the receiver 4, with the result that the formatting substep 42 requires decoding of transmitted data followed by encoding it in a new format.

In another variant, the user terminal 6 has direct access to the auxiliary program storage memory of the receiver 4 and the auxiliary programs are stored in directly executable forms.

Finally, in a further variant, the receiver 4 and the terminal 6 form a single device, thereby eliminating the need for a connection between them, and this single device may be used to connect other devices.

What is claimed is:

1. A method of managing of availability, of at least one terminal connected via a network to a receiver implementing the method, of auxiliary programs broadcast with main programs in a digital data stream, wherein the receiver is for forwarding at least a portion of said auxiliary programs to the at least one terminal, the method comprising:

receiving, at the receiver, a plurality of digital data streams including said digital data stream;

detecting, at the receiver, data identifying all the auxiliary programs contained in said digital data stream;

extracting, at the receiver, all the auxiliary programs identified in the stream, wherein all the auxiliary programs are associated with execution command data and storing all the auxiliary programs identified in the stream with the associated execution command data in temporary storage;

analyzing, at the receiver, execution commands obtained from the extracted and stored execution command data associated with the extracted and stored auxiliary programs, wherein analyzing the execution commands comprises:

reading execution command data of all the extracted and stored auxiliary programs; and eliminating execution commands of all the extracted and stored auxiliary programs that are synchronized with the digital data stream automatic execution of said extracted and stored auxiliary program with said main programs, said execution commands being referred to as immediate execution commands;

storing all the auxiliary programs identified, extracted from the digital data stream, and stored in temporary storage in a memory of the receiver, wherein synchronization with a main program of said main programs is eliminated from all the auxiliary programs identified, extracted and stored; and forwarding, by the receiver, to said at least one terminal and upon reception of a request from said at least one terminal, an auxiliary program of said auxiliary programs required by said at least one terminal, wherein the auxiliary program is forwarded as the auxiliary program is received from a transmitter, at the speed of a transmission carousel, and rapid transmission, by the receiver, at a high bit rate in an available slot of said carousel, in parallel with said forwarding, of said auxiliary program required by said at least one terminal, when said receiver has already stored said auxiliary program.

2. The method according to claim 1, wherein said detection comprises:

extracting a list of all the auxiliary programs contained in said digital data stream;

analyzing said list to identify the programs of the stream;

extracting a list of data identifying elementary streams that constitute each program;

analyzing data identifying elementary streams of all the programs to identify the auxiliary programs; and drawing up a list of all identifying data corresponding to auxiliary programs.

3. The method according to claim 1, wherein said extraction comprises:

extracting all the data packets transmitted in the digital stream corresponding to the auxiliary programs; and reconstructing all the auxiliary programs by recombining data packets as a function of their identification data.

4. The method according to claim 1, wherein said storage comprises formatting the auxiliary programs to be stored in a format adapted to their direct forwarding by said receiver to a user terminal and/or to their immediate use.

5. A receiver device, comprising:

a receiver configured to receive a plurality of digital data streams;

a detector configured to detect data identifying all the auxiliary programs within a digital data stream of the plurality of digital data streams;

an extractor configured to extract all the auxiliary programs identified in the digital data stream, wherein all the auxiliary programs are associated with execution command data, and store all the auxiliary programs identified in the stream and the associated execution command data in temporary storage;

an analyzer configured to analyze execution commands from the extracted and stored execution command data associated with the extracted and stored auxiliary programs, wherein analyzing the execution commands comprises: reading execution command data for all the extracted and stored auxiliary programs, and eliminating execution commands for all the extracted and stored auxiliary programs that are synchronized with the digital data stream for automatic execution of said extracted and stored auxiliary programs with the main programs, said execution commands being referred to as immediate execution commands; and a memory of the receiver device configured to store all the auxiliary programs identified, extracted from the digital data stream, and stored in temporary storage, wherein any synchronization with a main program of said main programs is eliminated from all the auxiliary programs identified, extracted, and stored;

a sender for:

forwarding, to said at least one terminal and upon reception of a request from said at least one terminal, an auxiliary program required by said at least one terminal, wherein the auxiliary program is forwarded as the auxiliary program arrives from a transmitter, at the speed of a transmission carousel, and rapid transmission at a high bit rate in an available slot in the carousel, in parallel with said forwarding, of said auxiliary program required by said at least one terminal, when said receiver has already stored said auxiliary program.

6. A system for managing auxiliary programs broadcast with main programs in a digital data stream, the system comprising a transmitter of a digital data stream and a receiver of that digital data stream connected to forward all or a portion of said digital data to a user terminal, and wherein said receiver is a receiver according to claim 5.

7. The system according to claim 6, wherein said receiver and said user terminal are connected via a data transfer network.

* * * * *